US006765918B1

(12) United States Patent
Dixon et al.

(10) Patent No.: US 6,765,918 B1
(45) Date of Patent: Jul. 20, 2004

(54) CLIENT/SERVER BASED ARCHITECTURE FOR A TELECOMMUNICATIONS NETWORK

(75) Inventors: Timothy J. Dixon, Wylie, TX (US); Michael Zimmerman, Dallas, TX (US)

(73) Assignee: Teledata Networks, Ltd., Herzliya (IL)

( * ) Notice: Subject to any disclaimer, the term of this patent is extended or adjusted under 35 U.S.C. 154(b) by 0 days.

(21) Appl. No.: 09/334,431

(22) Filed: Jun. 16, 1999

(51) Int. Cl.[7] .............................................. H04L 12/28

(52) U.S. Cl. ..................................... 370/401; 370/229

(58) Field of Search .............................. 370/352–358, 370/386, 389, 397, 391, 395, 395.1, 395.2, 395.3, 395.31, 395.41, 395.5, 395.51, 395.52, 395.53, 395.63, 401, 431, 229, 384, 385, 373, 377; 709/208, 203, 209

(56) References Cited

U.S. PATENT DOCUMENTS

| | | | |
|---|---|---|---|
| 5,475,696 A | | 12/1995 | Taniguchi |
| 5,781,320 A | | 7/1998 | Byers |
| 5,805,595 A | * | 9/1998 | Sharper et al. ............. 370/442 |
| 5,835,491 A | * | 11/1998 | Davis et al. ................ 370/390 |
| 5,838,683 A | | 11/1998 | Corley et al. |
| 5,920,258 A | | 7/1999 | Kusyk et al. |
| 5,991,292 A | * | 11/1999 | Focsaneanu et al. ........ 370/352 |
| 6,035,028 A | | 3/2000 | Ward et al. |
| 6,044,403 A | * | 3/2000 | Gerszberg et al. .......... 709/225 |
| 6,115,355 A | | 9/2000 | Rao |
| 6,353,742 B1 | | 3/2002 | Bach |
| 6,363,079 B1 | * | 3/2002 | Barzegar et al. ............ 370/465 |
| 6,400,708 B1 | * | 6/2002 | Bartholomew et al. ..... 370/352 |
| 6,470,018 B1 | | 10/2002 | Wiley et al. |
| 6,563,816 B1 | | 5/2003 | Nodoushani et al. |
| 6,570,855 B1 | | 5/2003 | Kung et al. |

FOREIGN PATENT DOCUMENTS

| | | |
|---|---|---|
| EP | 0 829 995 A2 | 3/1998 |
| EP | 0 829 995 A3 | 5/2000 |
| WO | WO 00/77990 A1 | 12/2000 |

OTHER PUBLICATIONS

"7R/E Packet Solutions Architecture", http://www.lucent-sas.com/7re/arch.html, 1 Pg., (1999).
"7R/E Packet Solution Architecture– Bringing Reliable Service to the Packet Network", *Lucent Technologies Bell Labs Innovations*, 2 Pgs, (1999).
"Lucent Technologies Introduces Breakthrough in Bringing Reliable Packet Networks to Service Providers", 7R/ETM Press Release, Lucent Technologies Bell Labs Innovations, 4 Pgs., (Apr., 1999).
"Lucent Tecnologies Switching and Access Solutions at SuperComm '99", *Lucent Technologies Bell Labs Innovations*, 4 Pgs., (Jun., 1999).

* cited by examiner

*Primary Examiner*—Wellington Chin
*Assistant Examiner*—Brenda Pham
(74) *Attorney, Agent, or Firm*—Blakely Sokoloff Taylor & Zafman LLP

(57) ABSTRACT

A telecommunications network is provided. The network includes a packet network. The network also includes a plurality of multimedia channel banks. The multimedia channel banks are coupled to the packet network over a communication link, and are configurable to have a plurality of ports that are each capable to receive signals from user equipment in one of a variety of formats. The network also includes a multimedia resource manager communicatively coupled to the packet network. The plurality of multimedia channel banks and the multimedia resource manager are associated in a client/server relationship to control attributes of the multimedia channel banks and to control allocation of bandwidth in the communication link between the multimedia channel bank and the packet network.

20 Claims, 3 Drawing Sheets

CLIENT/SERVER BASED ARCHITECTURE FOR A TELECOMMUNICATIONS NETWORK

TECHNICAL FIELD OF THE INVENTION

The present invention relates generally to the field of telecommunications and, in particular, to a client/server based architecture for a telecommunications network.

BACKGROUND

The rise in the popularity of new forms of communication such as the Internet has driven the need for network systems that offer greater and greater amounts of bandwidth. Prior to the explosion of the Internet's popularity, most telecommunications systems were designed with an architecture to support primarily a single service (e.g., voice calls). Today, the newer telecommunication systems must be designed for the larger bandwidth demands of data traffic.

Current networks provide a communication stream of traffic between a user and a content provider, the two edges of a communication link. Essentially, all media traffic (e.g., Internet protocol (IP) traffic) with the signaling and service attributes flow in the same channel of the network; fitting into the "in-band" control paradigm. This communication link typically includes an access network that provides access for users to a core transport network. Typically, the core network and the access network do not have the intelligence to streamline control information and to act upon it. It is simply not cost effective for these networks to be continuously upgraded to support new control information models (e.g., models that are designed at layer 3 or higher in the protocol stack) as they are developed. Thus, today, the core and access networks are relatively inflexible networks that provide simple bandwidth pipes from end users to the content providers.

One example of a current architecture for higher bandwidth applications is the digital subscriber line (DSL), a technology that dramatically increases the digital capacity of ordinary telephone lines (the local loops) into the home or office. At the central office (CO), a device known as the digital subscriber line access multiplexer (DSLAM) for DSL service intermixes voice traffic and data traffic onto a customer's DSL line. It also separates incoming phone and data signals and directs them onto the appropriate carrier's network. A DSLAM is a transport device that typically deploys bandwidth services ranging from 1.5 to 6 Mbps downstream and 250 Mbps to 512 Mbps upstream.

One problem with a DSLAM is that the DSLAM performs a relatively non-intelligent transport function. In essence, the DSLAM takes in lower speed data lines and multiplexes the data lines into a higher speed link. The DSLAM does not manage or switch data because, by its very definition, the DSLAM performs a multiplexing function and does not understand the services that are being transported in the data stream. In addition, no time domain gains are achieved, as DSLAMs just multiplex data and do not perform call setup and switching on demand. The DSLAM design limits the ability of the system to deliver only a limited amount of bandwidth to the end customer. Through buffering techniques bandwidth can be oversubscribed, but due to the limitations of the DSLAM, the service provider cannot tear down and set up calls to deliver just the right amount of bandwidth in a certain time domain. To overcome this problem, additional equipment must be used in conjunction with a DSLAM that know about the services to assist in improving allocation of resources.

For example, a DSLAM can be used to provide Internet access by providing a point-to-point protocol (PPP) server on the network side of the DSLAM. Basically, the PPP server is an additional module that makes an association between a user and a connection for a particular Internet service provider (ISP) that the user wants to connect to, so that the user can get onto the Internet. Unfortunately, this PPP server only addresses the problem controlling a single service. Subscribers may desire additional services over their ADSL line. With a typical ADSL line, a subscriber receives one regular phone line and a data connection. Oftentimes, a user will want more phone lines or other services in addition to Internet access. To accomplish this, the service provider must add other equipment semi-in-parallel to supplement the DSLAM and/or change the end devices to provide, e.g., voice over ATM, because a DSLAM has no service level knowledge of the data that is passing through it. Essentially, additional equipment or modules must be added at the central office for every different service provided to a subscriber.

Another problem with a network architecture based on the DSLAM is the delivery of higher bandwidth services. Because the DSLAM is designed for primarily to perform a transport multiplexing function, a conventional DSLAM is not flexible in assigning additional network side trunk resources. Thus to address higher bandwidth services, e.g., for video on demand, the service provider may install yet another system in parallel with the DSLAM to provide access to this service.

For the reasons stated above, and for other reasons stated below which will become apparent to those skilled in the art upon reading and understanding the present specification, there is a need in the art for an improved architecture for a telecommunications network.

SUMMARY

The above-mentioned problems with telecommunications networks and other problems are addressed by the present invention and will be understood by reading and studying the following specification. A telecommunications network is described which employs a client/server architecture to allow intelligent allocation of bandwidth at a multimedia channel bank. The multimedia channel bank acting as a client is controlled by signals from a multimedia resource manager that acts as a server.

The client/server architecture provides a new way to streamline services and respond to new services layered on top of various transmission/transport access networks. By separating the transport entity (e.g., the multimedia channel bank or client) and the entity controlling Layer 3+ intelligence (e.g., the multimedia resource manager or server) required to respond to service requests, the client/server architecture provides the following advantages:

1. The multimedia channel bank provides a transport oriented element (e.g., high capacity transport on layers 1–3 of the protocol stack) that is capable of implementing intelligent functionality provided by the server while being embodied in hardware that can be located in an outside plant environment.

2. The multimedia resource manager provides layer 3 and above intelligence to the multimedia channel banks and accommodates software stacks and APIs. This is the suitable platform to provide intelligence while keeping an open environment for new enhancements.

3. As a server, the multimedia resource manager provides a mechanism for the multimedia channel banks to communicate with layer 3 and higher servers (e.g., content providers, Internet service providers (ISPs)).

4. The multimedia resource manager, as a server, can use commercial database information models to tailor specific service/user profiles.

As a further advantage, the client/server architecture allows the access network to respond to "out of band" control information and user requests on a dedicated, specialized server platform. This server (e.g., the multimedia resource manager) allows the network to handle multiplicity of protocols, APIs stacks and has the visibility to massive databases of service attributes, end-user profiles and accounts. The client/server architecture further provides the intelligence required to offer differentiated services on top of the ATM/IP transport network.

DETAILED DESCRIPTION

The following detailed description refers to the accompanying drawings that form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
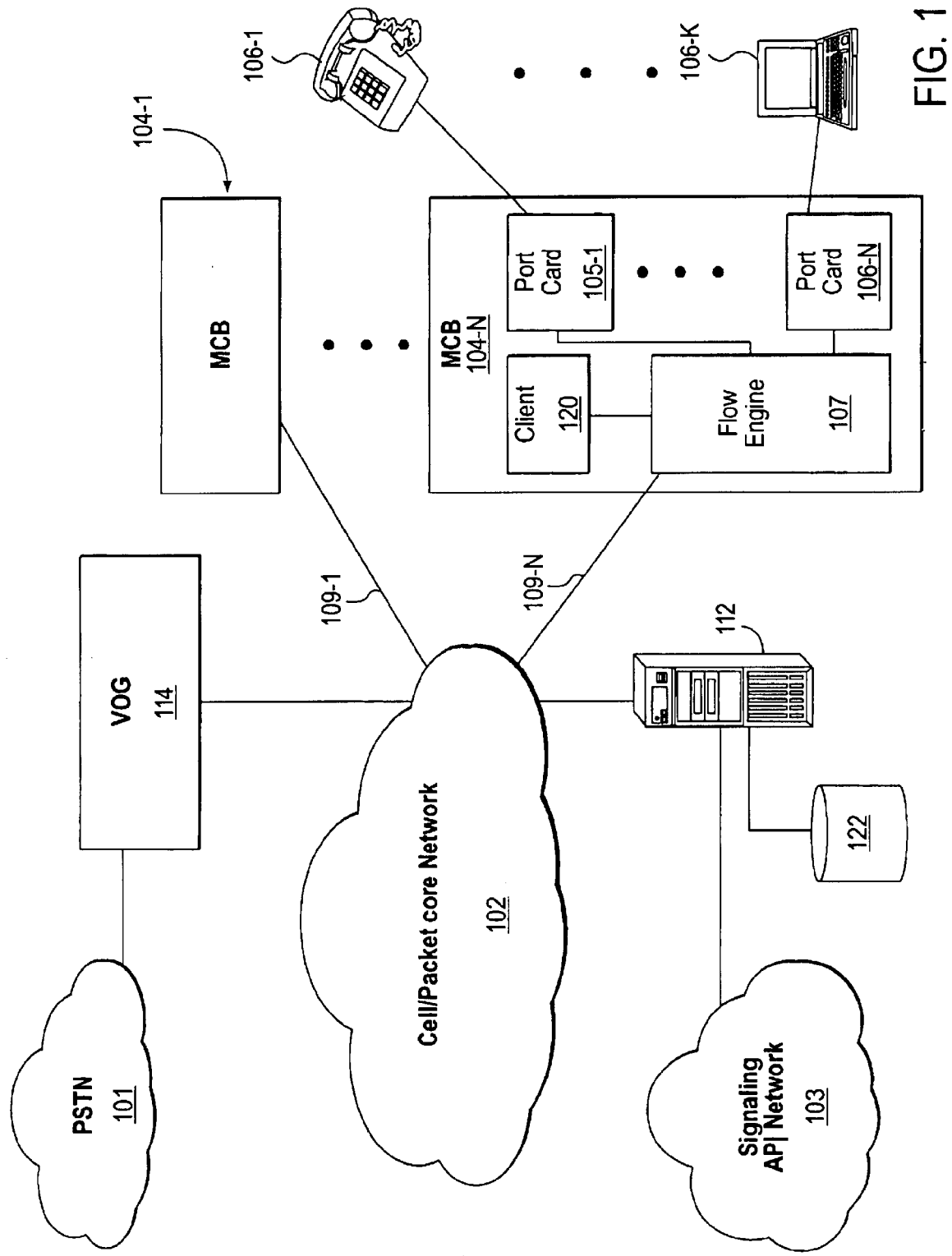
FIG. 1 is a diagram that illustrates an embodiment of a client/server based telecommunications network according to the teachings of the present invention.

FIG. 1 is a block diagram that illustrates a telecommunications network 100 according to the teachings of the present invention. Telecommunications network 100 uses a client/server architecture to provide access to networks that carry a variety of data, e.g., voice, video, and data. Advantageously, the use a client/server architecture allows intelligent allocation of bandwidth and control of a variety of services to be supported without the need to add additional equipment to the system as services are added or modified. Thus, telecommunications network 100 can be termed a "multimedia" network that provides intelligent allocation of bandwidth to carry voice, data, and video signals between users and the network. In FIG. 1, telecommunications network 100 is illustrated as providing access to at least three different types of networks. These include a time division multiplex (TDM) network for voice communications services 101 (e.g., the public switched telephone network (PSTN)), a cell/packet network for digital data information 102 (e.g., an asynchronous transfer mode (ATM) network), and a signaling/application protocol interface (API) network 103.

The telecommunications network 100 includes a plurality of multimedia channel banks (MCBs) 104-1, . . . , 104-N which replaces the traditional remote terminal (RT) of a digital loop carrier (DLC) system and potentially remote DSLAMs and ONUs. Each of the MCBs 104-1, . . . , 104-N include a number of port cards, 105-1, . . . , 105-M. MCBs 104-1, . . . , 104-N provide an edge access platform that supports narrowband and broadband traffic flows. In one embodiment, the port cards 105-1, . . . , 105-M include plain old telephone service (POTS) cards with 24 channels per card, integrated services digital network (ISDN) port cards with 12 channels per card, and asynchronous digital subscriber line (ADSL) port cards with six channels per card. Each of the port cards, 105-1, . . . , 105-M couple to numerous types of user equipment, 106-1, . . . , 106-K. The user equipment 106-1 , . . . 106-K, includes, for example, telephones, computers, video set-top boxes, and other multimedia devices that produce data and video signals.

As part of the MCBs 104-1, . . . , 104-N, the port cards, 105-1, . . . , 105-M couple to a flow engine 107 that is modifiable via signals from a traffic-servicing client 120. The flow engine 107 assigns and manages the ATM/IP flows for the transmission of data signals to and from the user equipment 106-1, . . . , 106-K. In other words, the flow engine 107 has an ATM/IP layer visibility. The flow engine 107 grooms and multiplexes services for transmission over a high-speed link 109-1, . . . , 109-N. In one embodiment, the high-speed links 109-1, . . . , 109-N are OC-3c/OC-12c lines according to the synchronous optical network (SONET) standard, to a packet/cell based core network.

As shown in FIG. 1, the ATM/IP flows from MCB 104-1 to 104-N are transported by a generic cell/packet network102. Network 102 provides connectivity and on-demand assignment of ATM/IP flows (e.g., private network to network interface (PNNI), LDP) to the content providers. The network 102 provides the connectivity between the MRM 112, which is the Server, to a voice over gateway (VOG) 114 and multiple MCBs, 104-1, . . . , 104-N, acting as clients.

The VOG 114 has a similar functionality to a TDM gateway. In one embodiment, the VOG 114 terminates one OC-12c link from the network 102. The OC-12c provides DS1 CES traffic. The DS1s carry DS0 voice channels from the MCBs 104-1, . . . , 104-N. In one embodiment, the VOG 114 mediates these DS1s to a Class 5 TR-008 or GR-303 interface to the PSTN 101. The VOG 114 is capable of processing 2016 DS0 channels for GR-303 or TR-008 interfaces. With a 1:4 internal concentration in VOG 114, the fan-out is 8064 DS0channels.

In one embodiment, the VOG 114 supports signaling system 7 (SS7) signaling. In this example, the DS0 assignment of the VOG 114 is controlled by the MRM 112. VOG 114 provides tones and collects dual tone multi-frequency (DTMF) digits. With SS7 implementation, the VOG 114 supports channelized high capacity links (e.g. DS3, OC-3). Several VOGs 114 may be stacked to provide a single SS7 termination point.

The Multimedia Resource Manager (MRM) 112 serves as a real time signaling proxy and resource manager capable of controlling traffic attributes and user profiles of multiple MCBs 104-1, . . . , 104-N and VOGs 114. These attributes include, but are not limited to, routing information, protocols for service connection, Class of Service, and other appropriate attributes of a telecommunications connection. The MRM 112 controls the attributes of MCB 104-1, . . . , 104-N and VOG 114 in response to several triggers, e.g. scripts, network signaling, end-user signaling, and APIs. To accomplish this, the MRM 112 includes a server that is communicatively coupled to, for example, client 120 of MCB 104-N. The MRM 112 can be located almost anywhere in the network 100, with established communication links with clients at the MCBs 104-1, . . . , 104-N and VOGs 114. In one embodiment, the MRM 112 controls on-demand adaptation profiles of IP traffic flows to ATM virtual circuits (VCs) and acts as a server to user equipment 106-1, . . . , 106-N, e.g., a VDSL set-top box.

In one embodiment, the MRM 112 is implemented as a software platform on a standard UNIX/NT platform. The MRM 112 acts as a layer 3 (and above) server to MCBs 104-1, . . . , 104-N. For example, the MRM communicates with end user applications, e.g., SVC (Win2000), web browser plug-ins, based on layer 3 or higher information exchange. The MRM 112 also controls the attributes and resources of the MCBs 104-1, . . . , 104-N in response to multiple triggers to provide streaming of a variety of services to user equipment 106-1, . . . , 106-K. In one embodiment, the MRM 112 responds to the following triggers:

1. The end-user signaling/request for services. These requests can be generated by ADSL ATU-R, VDSL set-top box, HomePNA NID, WEB browser or any other intelligent terminal or software package at user equipment 106-1, . . . , 106-K. The messages are tunneled to the MRM 112 by the MCB 104-1, . . . , 104-N. The MCB 104-1, . . . , 104-N may need to provide low-layer message processing so as not to overload the MRM 112 real-time and communication link, e.g., Layer 2 termination. The MRM 112 modifies the profile of these elements in response to a service request.

2. External signaling/service request. These requests can be generate by content providers/servers, outband signaling network, e.g. SS7, or proprietary implementations. These requests may communicate directly to the MRM 112 from the ISP/content provider/Service Farm and associate the requested service with a specific end-user associated with the MRM 112.

3. Network signaling, tunneled by the MCB, e.g. Q.2931.

In one embodiment, the MRM (112) has a secure and protected high-speed communication channel to the MCBs 104-1, . . . , 104-N, (e.g., IP tunnels). This communication channel may comprise a permanent virtual circuit (PVC). This communication channel allows MCBs 104-1, . . . , 104-N to set up/tear down ATM virtual circuits (VCs) with an allocated profile from MRM 112 in response to multiple triggers. This channel is also used to modify the profile of established broadband connections, e.g. PVCs. In the time division multiplexed (TDM) domain, the MRM 112 also supports SS7 and GR-303. After receiving a trigger, the MRM 112 may need to consult internal or external data-base 122 for certain attributes and initiate resource allocation commands to a certain MCB104-1, . . . , 104-N, for a certain user equipment 106-1, . . . , 106-K. Optionally, the MRM 112 may propagate the service request to a content provider.

The management and provisioning of the MCBs 104-1, . . . , 104-N and the VOG 114 may be implemented by the MRM 112. As an option, the management application may reside on a different host (physically detached from the MRM). In one embodiment, the MCBs 104-1, . . . , 104-N are associated with the MRM 112 and are associated with a management application, on a different Server.

In one embodiment, the MRM 112 is a redundant platform that resides in, e.g., at least two locations.

Embodiments using the Client/Server Based Architecture

Figure 2:
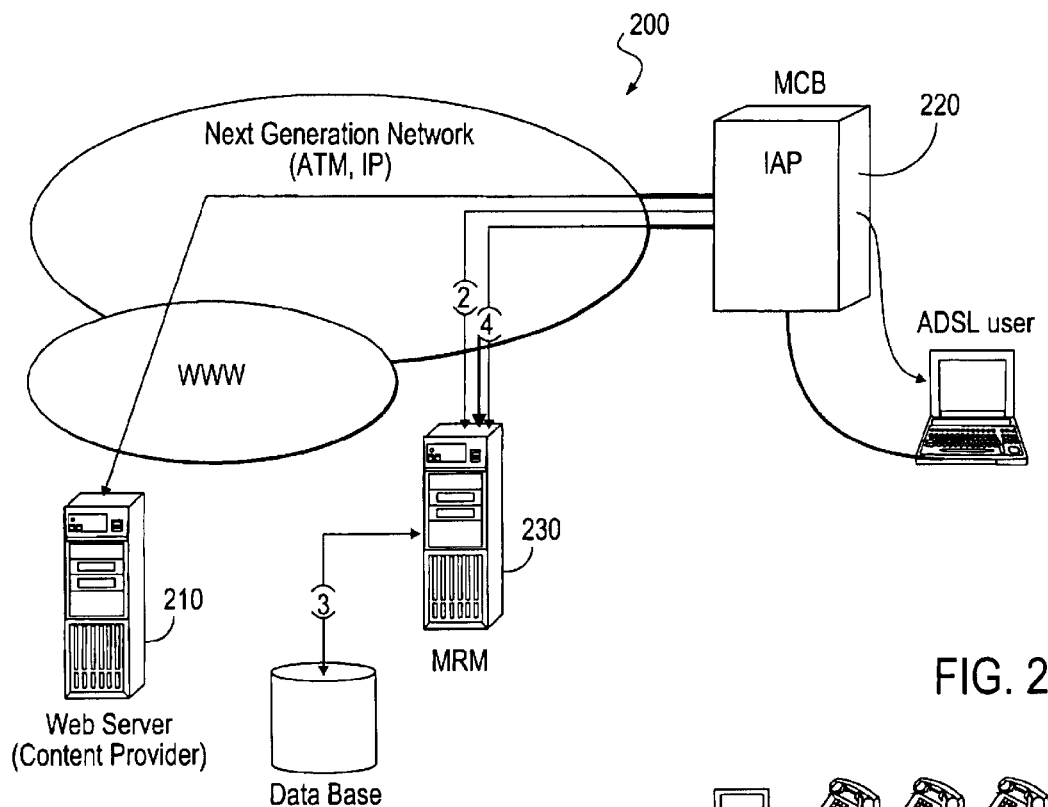
FIG. 2 is a block diagram of an alternative embodiment of a telecommunications network according to the teachings of the present invention.

FIG. 2 is a block diagram of another embodiment of a telecommunications network indicated generally at 200. Network 200 presents how a client/server-based architecture provides distributed broadband call agents. In this embodiment, the user requests a broadband service that translates to a new broadband traffic flow through the network, up to the content provider 210. In this embodiment, the MCB 220 sets the traffic flow (managing the layer 1 through 3 attributes), while the MRM 230 provides the intelligence to establish the broadband flow. In this embodiment, the service flow goes as follows. First, the user receives a complete profile as to how to launch the service, e.g. accessing a home page of a content provider 210. The information may include security keys, traffic attributes, address information, and other information that is used to communicate with content provider 210. Second, the user uses a certain application socket to activate a protocol stack towards the network, e.g., MCB 220. The call/service initiation message is intercepted by the MCB 220 and tunneled to the MRM 230.

Third, the MRM 230 analyzes the message content and acts upon it. This includes, but is not limited to: resolving the destination addresses and making the routing choice, consulting a database for security, and authorization, translating the request to the required network protocol stack, and generating reports to a billing server. Fourth, the MRM 230 completes the processing. To complete the processing the MRM launches the applicable protocol stack in the MCB 220 and modifies the MCB 220 resources to correspond to the new request. Upon completion, the network 200 and the user side connections are formed and the broadband traffic flow is assured.

Figure 3:
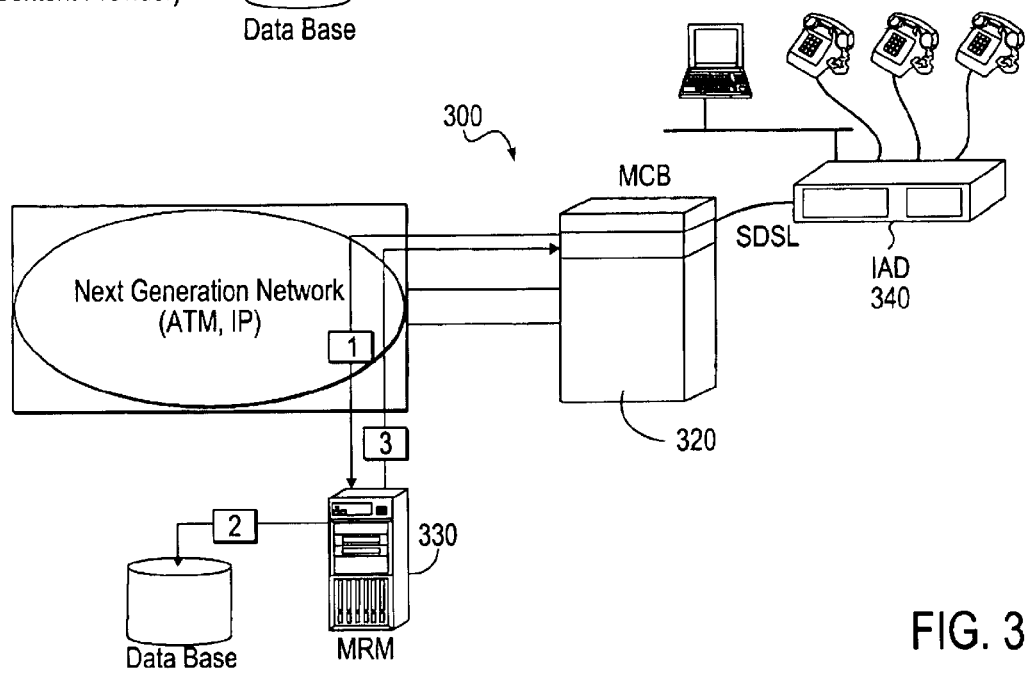
FIG. 3 is a block diagram of an alternative embodiment of a telecommunications network according to the teachings of the present invention.

FIG. 3 is a block diagram that illustrates another embodiment of a telecommunications network indicated at 300 that manages Internet protocol (IP) traffic flow. In this embodiment, the MCB 320 hands-off native IP drops, which terminate in an integrated access device (IAD), or a customer premises equipment (CPE) 340. IAD/CPE may represent, for example, a hub for home networks, set-top boxes or any other broadband termination point. In the architecture of network 300, the MCB 320 processes the traffic in layer 2 or 3, while the MRM 330 provides the intelligence of how to route the traffic, classify it, apply policing/quality of service (QoS), etc, to individual flows. A module on the MCB 320 terminates the physical drop, e.g. a synchronous digital subscriber line (SDSL) and maps the IP flow in to the ATM VC. The IP processing, mapping profile and the policing profile are dynamically enabled by the MRM 330, upon triggers from the MCB 320. In one embodiment, the MRM 330 provides the intelligence for the IAD, e.g. call agent.

In this embodiment, the IP module in the MCB 320, houses IP processing, e.g. routing, Multi Protocol Label Switching (MPLS). The IP module itself uses the MCB 320 common as an ATM fabric and communicates indirectly with the MRM 330. The MRM 330 provides a gateway element for CPE management (IAD/CPE uses the MRM 330 for proxy to separate application for configuration, alarms, etc.).

Figure 4:
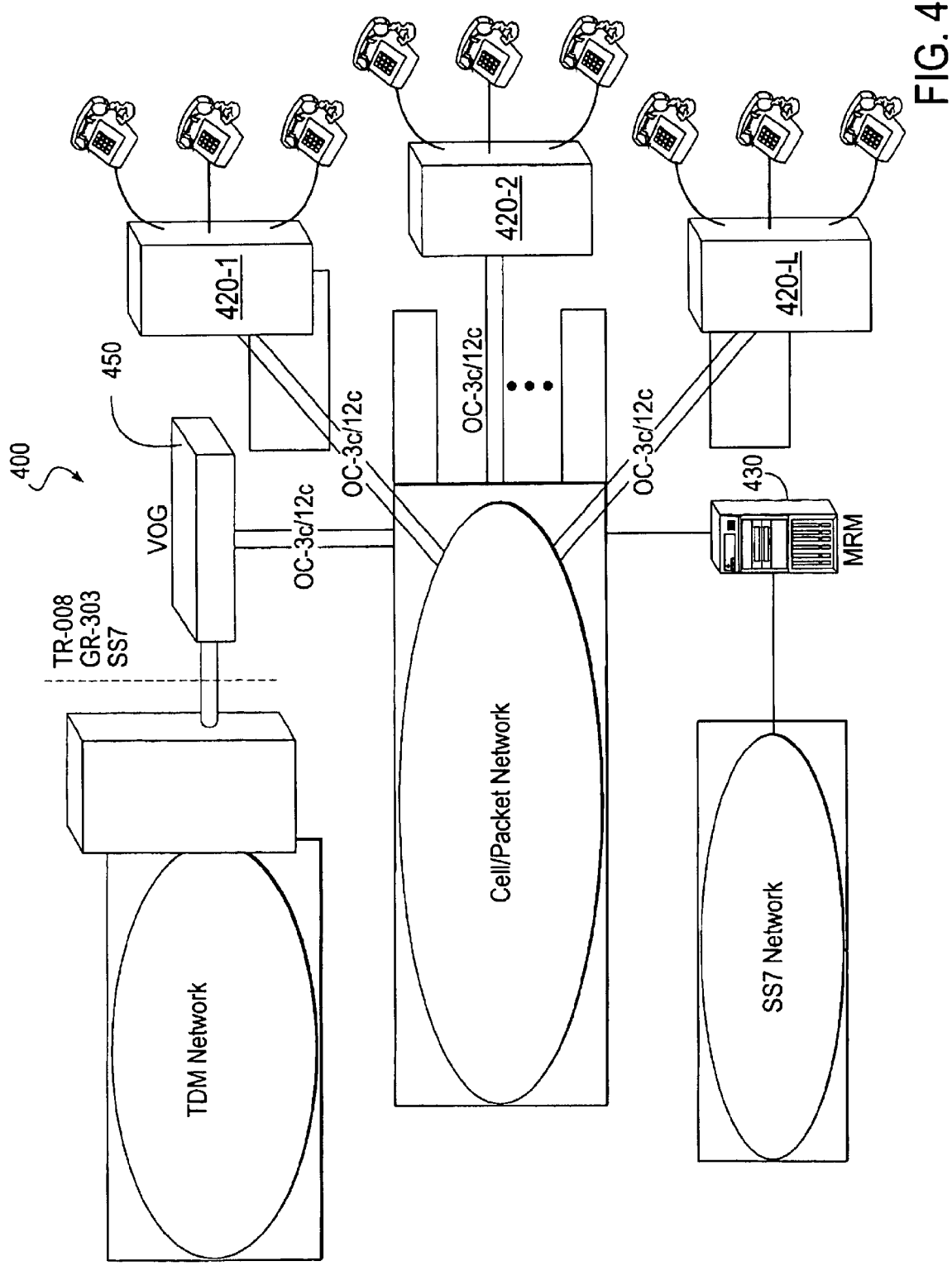
FIG. 4 is a block diagram of an alternative embodiment of a telecommunications network according to the teachings of the present invention.

FIG. 4 is a block diagram of another embodiment of a telecommunications network indicated generally at 400 and constructed according to the teachings of the present invention. In this embodiment, network 400 finds application as the next generation of a digital loop carrier (NGDLC). The NGDLC application utilizes the distributed architecture of network 400 to serve large numbers of physically dispersed telephony users, using a common ATM transport and minimizing the Class 5 (or other TDM element) resources. The VOG 450 is the TDM Point of Presence, providing any TDM network interface. The MRM 430 works with the VOG 450 to resolve the TDM signaling.

The MCBs 420-1, ..., 420-L will be populated with large number of telephony ports (which coexist with other broadband ports). All telephony users are being multiplexed and concentrated (based on configurable 1:N ratio) at the MCBs 420-1, ..., 420-L and all traffic is backhauled to the VOG 450, as DS1 CES traffic (via the packet network).

In this embodiment, the VOG 450 terminates traffic for multiple MCBs 420-1, ..., 420-L and streamlines all DS0 traffic to TR-008 and GR-303 interfaces. The VOG 450 can provide the channelized, high capacity interfaces (DS-3, OC-3) for Next Generation Switches, which are positioned to displace Class 4 and 5 TDM switches. The VOG 450 is a flexible, high-capacity TDM hub, which can handle up to 2016 simultaneous DS0 calls. Any telephony user can be associated with any interface group (TR-008, GR-303).

In one embodiment, the VOG 450 provides SS7 peer-to-peer connectivity to the Next Generation Switches. The MRM 430 provide the SS7 processing while managing the DS0 and internal resources of the VOG (digits collection, etc.).

Considering a FTTS area deployment, each MCB supports 300–500 users. Assuming a one to two concentration ratio, each VOG 450 supports 6–13 MCBs. With higher a concentration ratio, 1:4 (typically exercised for residential users), each VOG 450 can support 12–26 MCBs.

The MRM 430 brings more value in this application. For example, configuring MCBs 420-1, ..., 420-L with high DS0 concentration ratios. MRM 430 will track DS0 activity and when peak demand is detected in a certain MCB 420-1, ..., 420-L, MRM 430 establishes an additional switched virtual circuit (SVC), between the MCBs 420-1, ..., 420-L and VOG 450, with more bandwidth for voice traffic.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the MCBs 104-1, ..., 104-N can be modified by appropriate port cards to provide multimedia services other than those specified above. Further, the term "packet network" is intended to cover any appropriate packet or cell based network including, but not limited to, an asynchronous transfer mode network.

What is claimed is:

1. A method for establishing connections in a telecommunications network, the method comprising:
   receiving a request for service at a multimedia channel bank;
   communicating the request to a multimedia resource manager;
   identifying information relating to the request at the multimedia resource manager;
   communicating the information to the multimedia channel bank;
   controlling attributes of the multimedia channel bank based on the information from the multimedia resource manager; and
   launching selected protocol stacks at the multimedia channel bank.

2. The method of claim 1, wherein receiving a request for service comprises receiving a request generated by a user accessing a designated web page.

3. The method of claim 1, wherein receiving a request for service comprises receiving a request from an application socket launched to activate a protocol stack towards the multimedia channel bank.

4. The method of claim 1, wherein receiving the request comprises intercepting an initiation message at the multimedia channel bank.

5. The method of claim 1, wherein communicating the request to the multimedia resource manager comprises tunneling the message to the multimedia resource manager from the multimedia channel bank.

6. The method of claim 1, wherein identifying information relating to the request at the multimedia resource manager comprises at least one of resolving destination addresses and making a routing choice, consulting a database for security and authorization, translating the request to a network protocol stack and generating reports to a billing server.

7. The method of claim 1, wherein communicating the information to the multimedia channel bank comprises launching the application protocol stack in the multimedia channel bank and modifying the multimedia channel bank resources to correspond to the request.

8. The method of claim 1, wherein controlling attributes of the multimedia channel bank comprises at least one of controlling traffic attributes and user profiles.

9. The method of claim 1, wherein controlling attributes of the multimedia channel bank comprises controlling at least one of routing information, protocols for service connection, and class of service.

10. A method for controlling provision of services in a telecommunications network, the method comprising:
    receiving a request for service at a multimedia channel bank;
    communicating the request to a multimedia resource manager;
    identifying information relating to the request at the multimedia resource manager;
    communicating the information to the multimedia channel bank; and
    controlling attributes of the multimedia channel bank based on the information from the multimedia resource manager.

11. The method of claim 10, wherein receiving a request for service comprises receiving a request generated by a user accessing a designated web page.

12. The method of claim 10, wherein receiving a request for service comprises receiving a request from an application socket launched to activate a protocol stack towards the multimedia channel bank.

13. The method of claim 10, wherein receiving the request comprises intercepting an initiation message at the multimedia channel bank.

14. The method of claim 10, wherein communicating the request to the multimedia resource manager comprises tunneling the message to the multimedia resource manager from the multimedia channel bank.

15. The method of claim 10, wherein identifying information relating to the request at the multimedia resource manager comprises at least one of resolving destination addresses and making a routing choice, consulting a database for security and authorization, translating the request to a network protocol stack and generating reports to a billing server.

16. The method of claim 10, wherein communicating the information to the multimedia channel bank comprises launching the application protocol stack in the multimedia channel bank and modifying the multimedia channel bank resources to correspond to the request.

17. The method of claim 10, wherein controlling attributes of the multimedia channel bank comprises at least one of controlling traffic attributes and user profiles.

18. The method of claim 10, wherein controlling attributes of the multimedia channel bank comprises controlling at least one of routing information, protocols for service connection, and class of service.

19. A method for establishing connections in a telecommunications network, the method comprising:

receiving a request for service at a multimedia channel bank with a traffic-servicing client and a flow engine;

communicating the request to a multimedia resource manager;

identifying information relating to the request at the multimedia resource manager;

communicating the information from a traffic-servicing server of the multimedia resource manager to the traffic-servicing client of the multimedia channel bank; and controlling attributes of the multimedia channel bank based on the information received by the traffic-servicing client of the multimedia channel bank.

20. A method for establishing connections in a telecommunications network, the method comprising:

receiving a request for service at a multimedia channel bank that operates as a transport oriented element on layers 3 and below of the protocol stack;

communicating the request to a multimedia resource manager that provides a mechanism for the multimedia channel bank to communicate with layer 3 and above servers;

identifying information relating to the request at the multimedia resource manager;

communicating the information to the multimedia channel bank; and controlling attributes of the multimedia channel bank based on the information received from the multimedia resource manager.

* * * * *